No. 652,894. Patented July 3, 1900.
F. E. HERDMAN.
OPERATIVE MECHANISM FOR ELEVATORS.
(Application filed Feb. 20, 1900.)
(No Model.) 6 Sheets—Sheet 1.
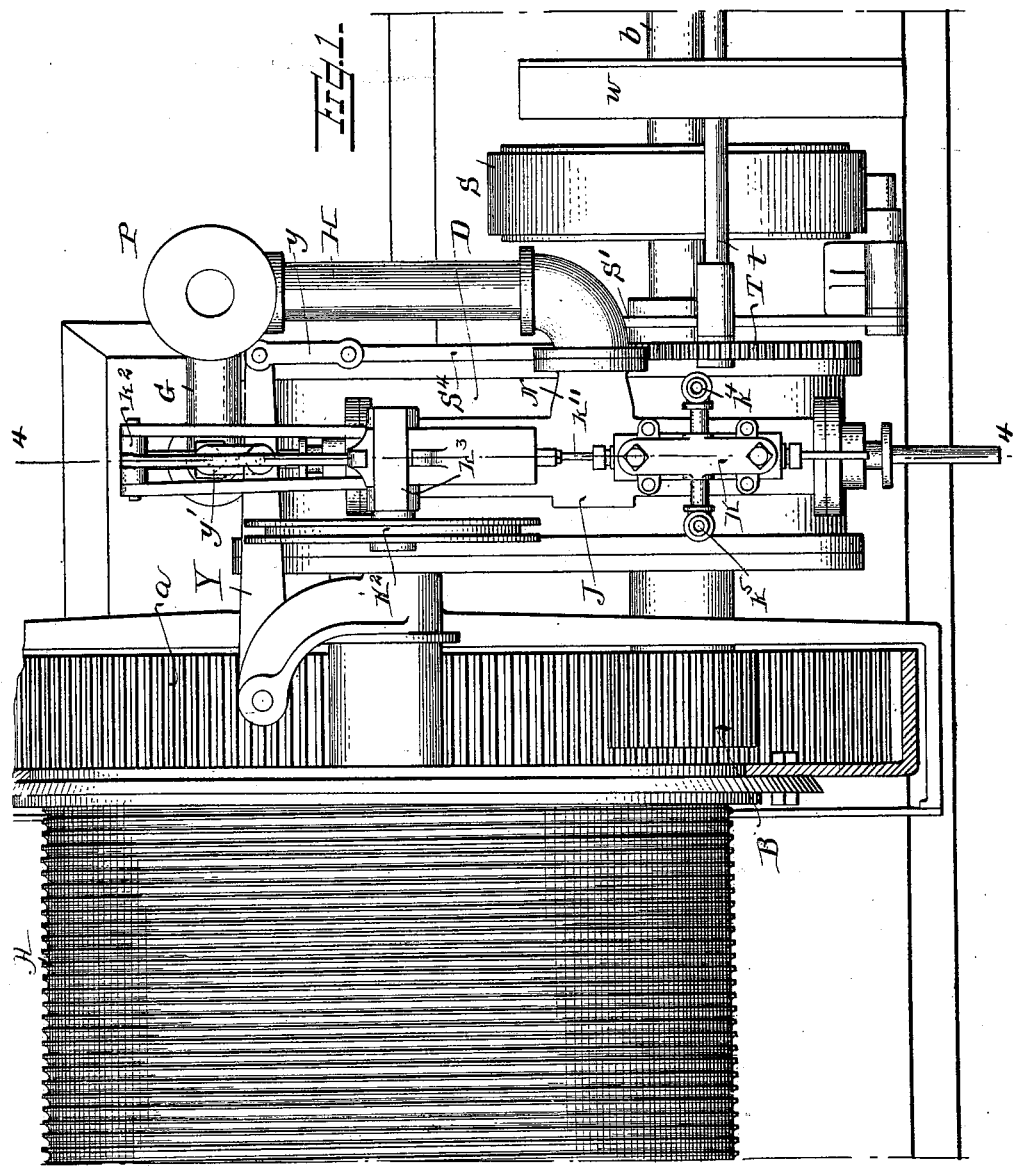

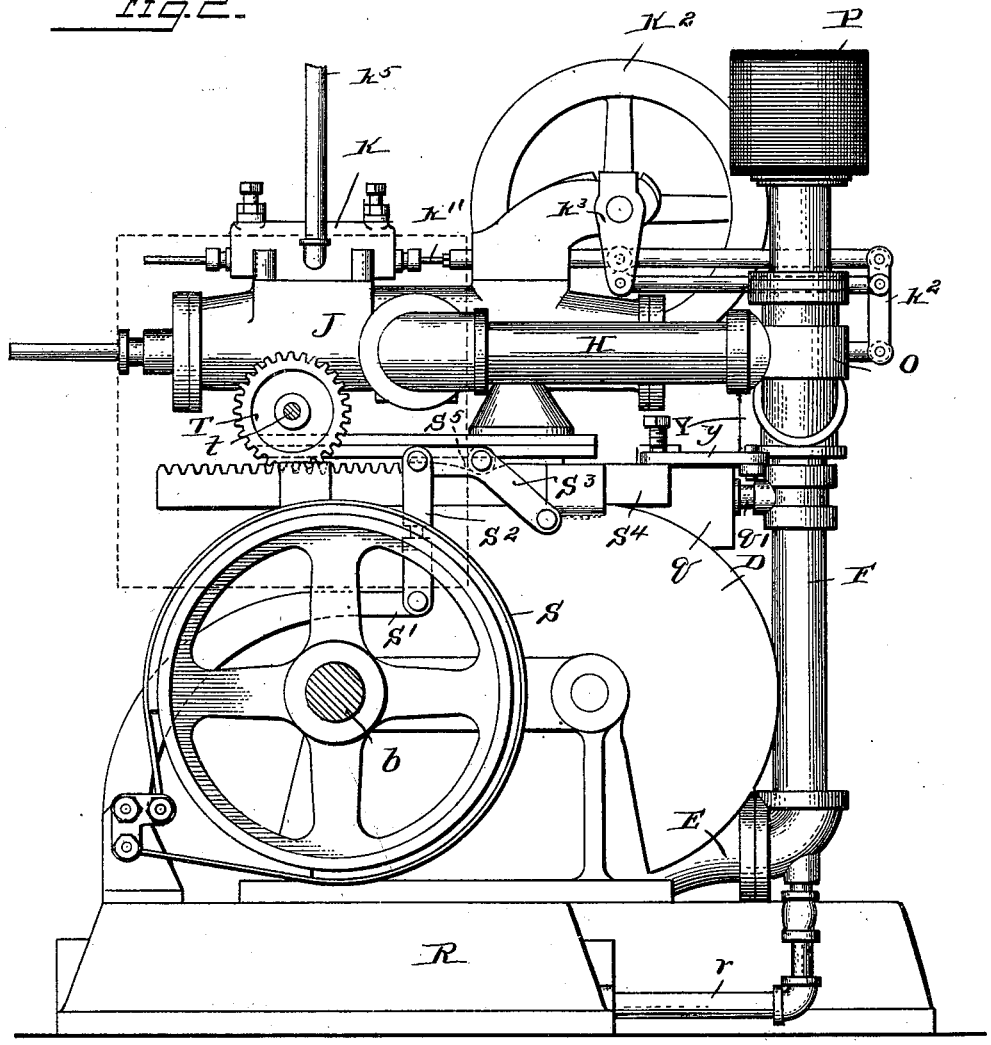

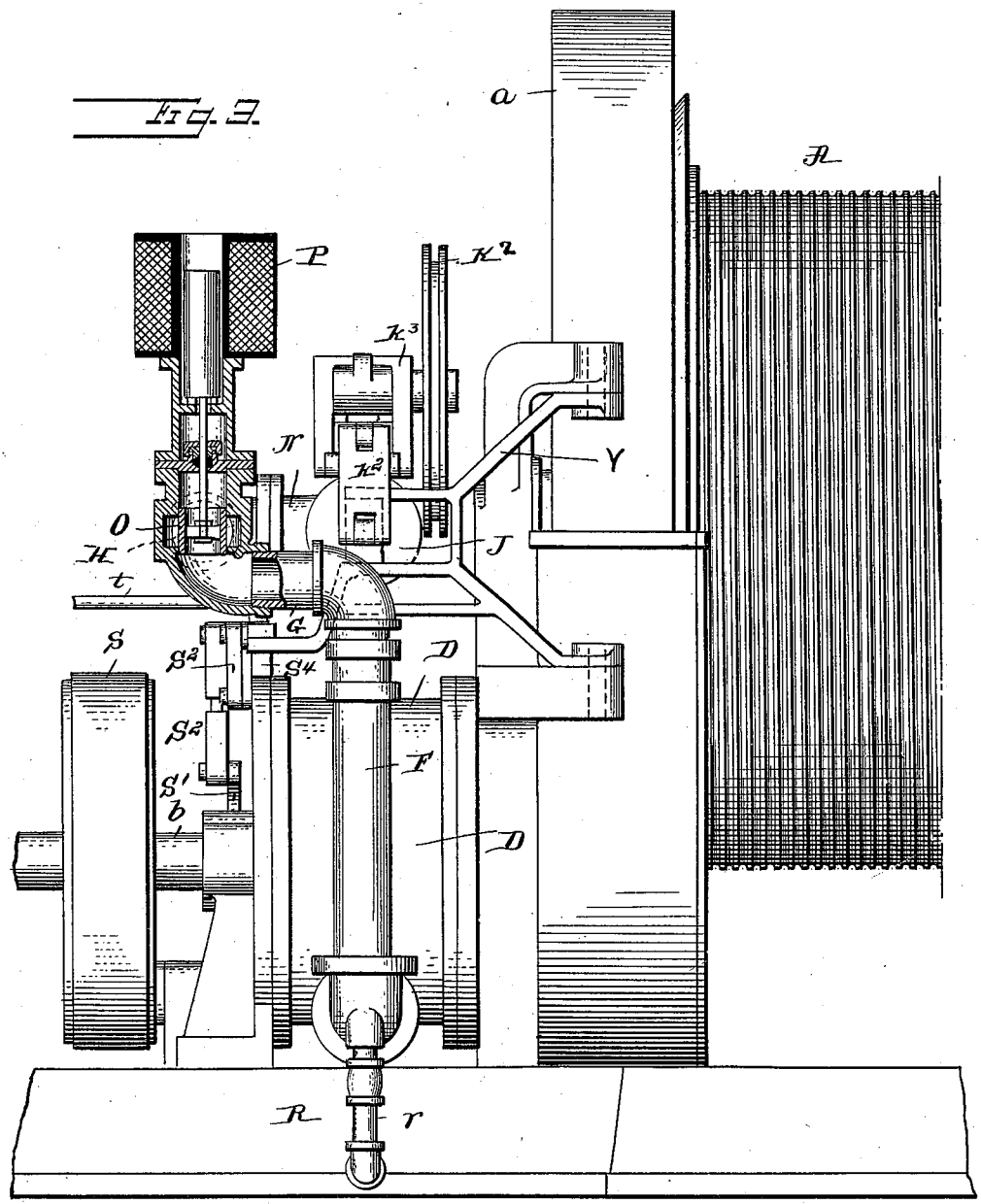

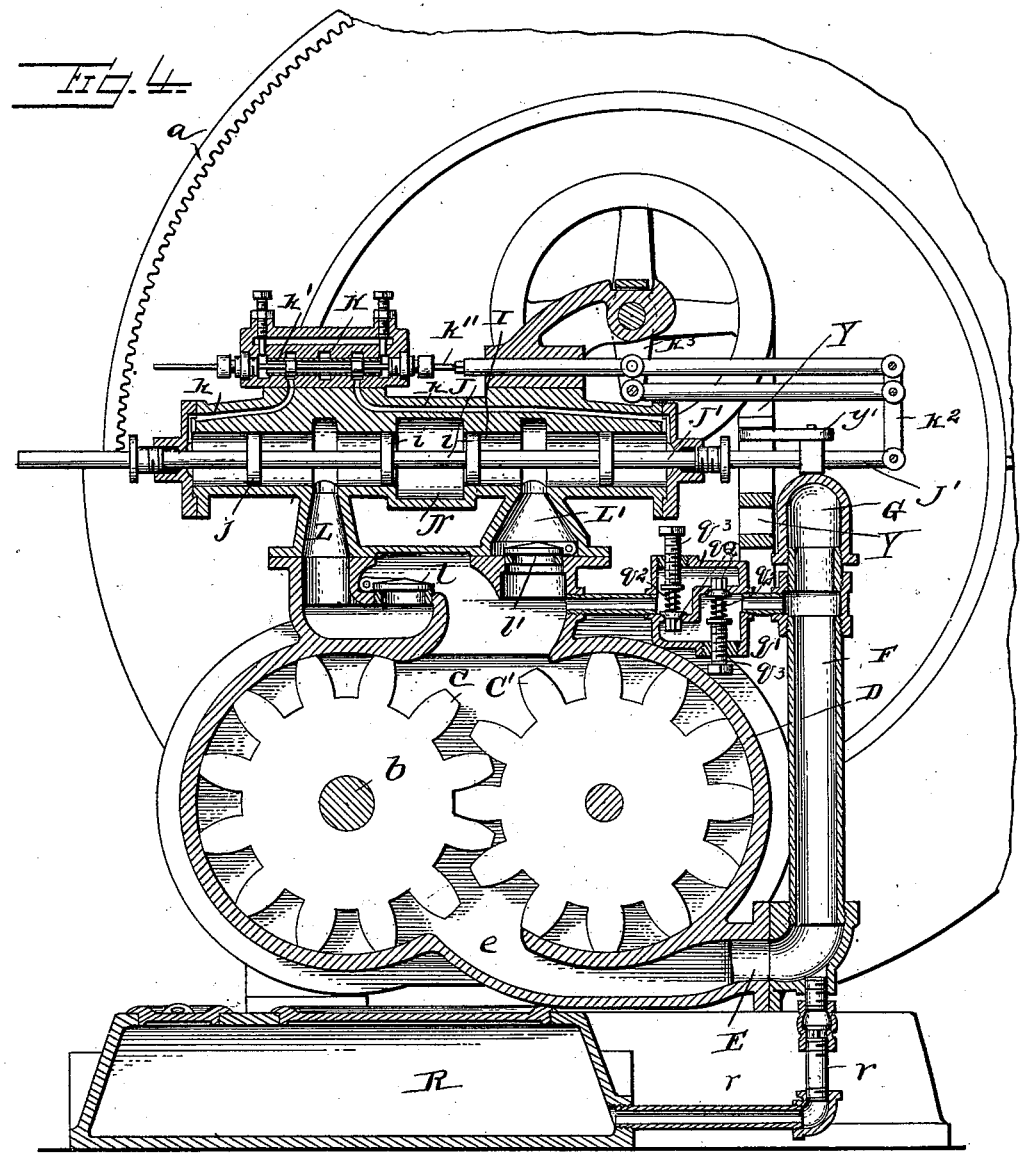

No. 652,894. Patented July 3, 1900.
F. E. HERDMAN.
OPERATIVE MECHANISM FOR ELEVATORS.
(Application filed Feb. 20, 1900.)
(No Model.) 6 Sheets—Sheet 5.
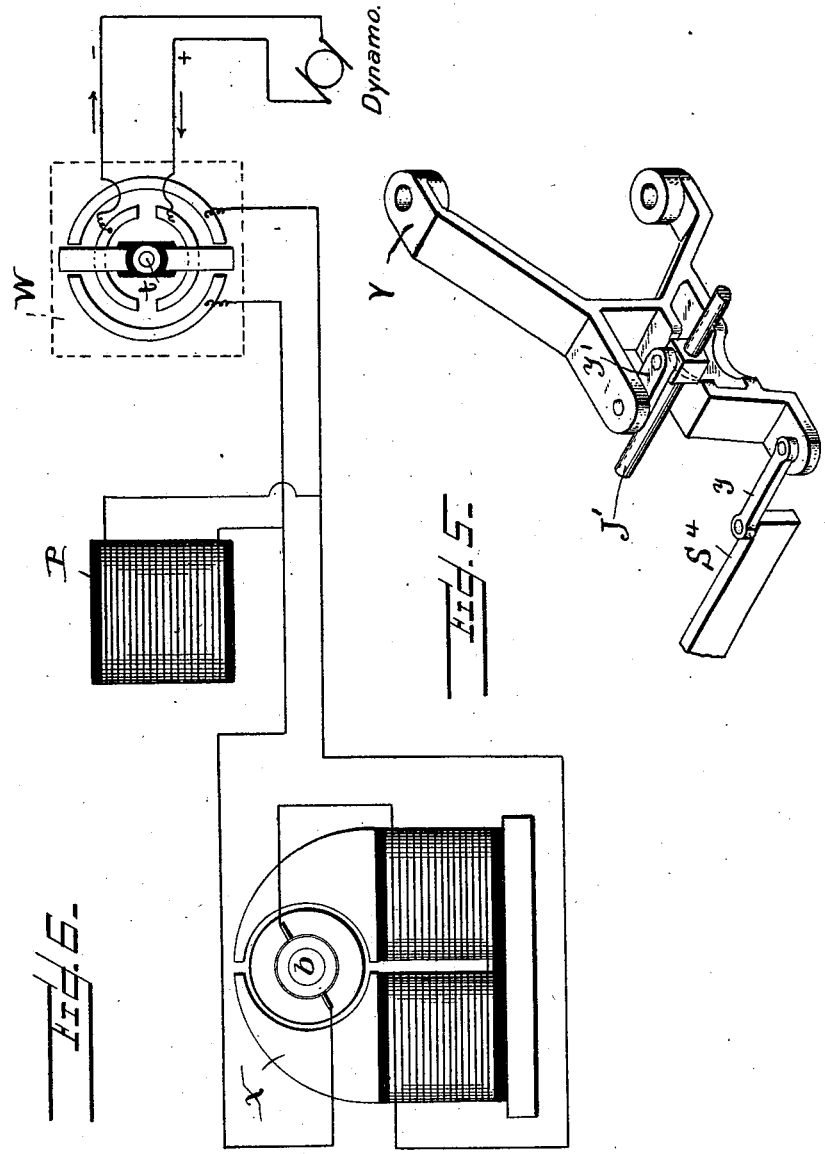

No. 652,894. Patented July 3, 1900.
F. E. HERDMAN.
OPERATIVE MECHANISM FOR ELEVATORS.
(Application filed Feb. 20, 1900.)

(No Model.) 6 Sheets—Sheet 6.

UNITED STATES PATENT OFFICE.

FRANK E. HERDMAN, OF WINNETKA, ILLINOIS.

OPERATIVE MECHANISM FOR ELEVATORS.

SPECIFICATION forming part of Letters Patent No. 652,894, dated July 3, 1900.

Application filed February 20, 1900. Serial No. 5,877. (No model.)

*To all whom it may concern:*

Be it known that I, FRANK E. HERDMAN, a citizen of the United States, residing at Winnetka, county of Cook, and State of Illinois, have invented a new and useful Improvement in Operative Mechanism for Elevators, of which the following is a full, clear, and exact description, reference being had to the accompanying drawings, which form a part of this specification.

The object of my invention is the production of certain mechanism in connection with elevators operated by rotary devices which will have all the advantages in stopping of a hydraulic elevator.

As is well known, with elevators operating by rotary devices the ordinary form of friction-brake is very uncertain in its action. With it the operator has no absolute control of the stopping and starting, as it will vary with different conditions of load and speed, to say nothing of variance of adjustment of the brake. The operating mechanism may be brought central with no certainty of the machine coming to rest. With an elevator operated by hydraulic machinery, however, the mechanism is such that when the operating mechanism becomes central the machine comes to rest with absolute certainty, regardless of varying conditions of load and speed. When the valve is closed, the machine cannot further move, and its closure can be regulated with the greatest nicety to prevent shock or jar.

I will now describe the embodiment of my invention illustrated in the accompanying drawings, in which—

Figure 7:
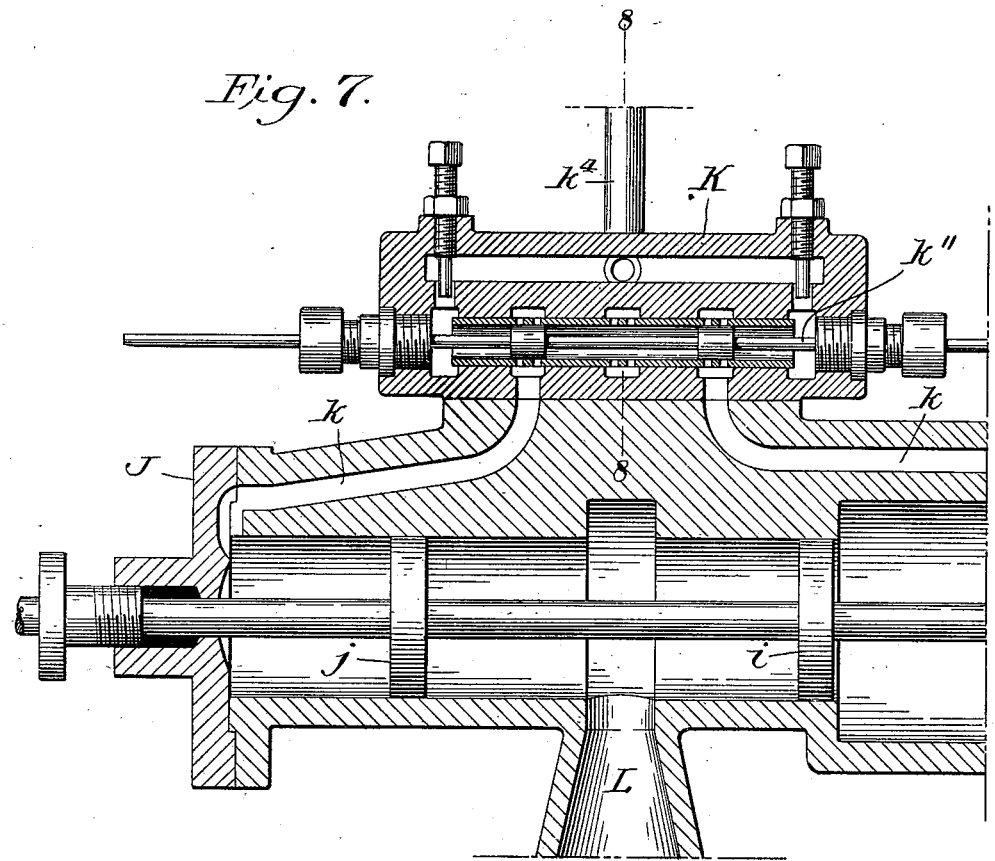
Figure 8:
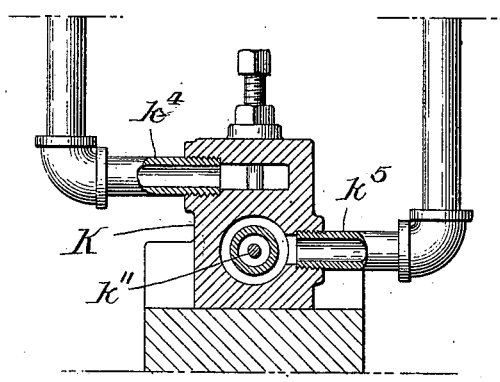

Figure 1 is a plan view of a portion of elevator mechanism. Fig. 2 is an end view of same. Fig. 3 is a rear view of same with portion broken away. Fig. 4 is a section on the line 4 4, Fig. 1. Fig. 5 is a detail perspective view of lever-and-link connections for operating the bar $S^4$. Fig. 6 is a diagram of the electrical connection. Fig. 7 is an enlarged section of pilot-valve and a portion of main valve. Fig. 8 is a section on the line 8 8, Fig. 7.

A is the winding-drum, and $a$ a gear secured to said drum, into which meshes the gear B on the driving-shaft $b$, driven by the motor X. (See Fig. 6.) On this shaft $b$ is the toothed wheel C, meshing with the toothed wheel C'. Both of these gears C and C' are inclosed within the case D, which is full of liquid, such as oil. E is a pipe leading from a port $e$ at one side of this casing and by means of the pipes F, G, and H extends to the portion N of the cylinder I. In this cylinder I is the piston-valve J, having the valve parts $i\ i$ and piston parts $j\ j$. The cylinder I at each end is connected by a passage $k$ with the cylinder $k'$ of a pilot-valve K. The pilot-valve is connected by the rod $k'$, bell-crank lever $k^2$, and crank $k^3$ with the operating-sheave $K^2$ of an elevating apparatus. The pilot-valve cylinder $k'$ has a connection $k^5$ with a source of liquid-supply and a connection $k^4$ with the exhaust. By operating this pilot-valve either end of the cylinder I may be brought in connection with the liquid-supply and the opposite end with the exhaust. The pressure passes through pipe $k^5$ to the cylinder of the pilot-valve K, and, dependent upon the position of the pilot-valve, it passes through one or the other of the passages $k$ to the cylinder I, forcing one of the pistons $j$ toward the center of the cylinder and forcing the other piston $j$, through the medium of the piston-rod, away from the center of the cylinder. The liquid behind the last-named piston $j$ passes out through the other passage $k$ to the cylinder of the pilot-valve K and thence into exhaust-pipe $k^4$, through which it exhausts. The cylinder I has two ports L and L', opening into the casing D on opposite sides of the valve parts $i\ i$. The movement of the valve J in one direction from central position connects the chamber N with port L and in the other direction with port L'. In port L is a flap-valve $l$, opening toward the casing D, and in port L' is a flap-valve $l'$, opening away from casing D. As the toothed wheels C C' revolve the liquid in the casing D is circulated, thus acting as a rotary pump. Considering the operation independent of the valve J, in one direction the water will circulate through pipe E and pipes F, G, and H to port L through port L, raising flap-valve $l$, to casing D, the liquid being prevented from passing from chamber N to the casing through port L'. When the gears move in the opposite direction, the liquid passes from casing D to chamber N through port L', thus circulating in the opposite direction. The gear B being on the driving-shaft, its rotation and direction of rotation is determined by the rotation and direction of rotation of the driving-shaft. The piston-valve J, through the medium of the pilot-valve and its connection with the operating-sheave, is correspondingly controlled to bring the chamber N in connection with either the port L or port L', dependent upon the direction of travel of the elevator. As may be seen, there is a passage from one side to the other of casing D, and, determined by the direction of movement of the toothed wheels C C' and the position of the valve parts $i$ $i$, the liquid flows in one direction or the other through this passage or by the position of the valve parts $i$ $i$ is locked from movement. By this construction, as may be seen, so long as the valve J is moved from its central position in either direction a free passage for the liquid from one side to the other of the casing D is obtained, and, the movement of the gears circulating the liquid, there is substantially no retardation to the movement of the elevating mechanism. On the other hand, the moment the valve J is thrown centrally the liquid is no longer enabled to circulate and forms a positive braking power to bring the elevator to rest. This construction therefore practically gives all the advantages of stopping that are obtained with a hydraulic elevator.

In order to prevent the possibility of the car, which is ascending with a light load or descending with a heavy load, running away in case the control of the propelling force should pass from the control of the operator, there is placed in the pipe F a check or choke valve O. This valve is connected with the propelling power, which when in operation holds it open, and when the power is cut off the valve closes upon its seat. As shown in the drawings, the valve O is controlled by the solenoid P, which is energized by the current which operates the motor driving the elevator. When the current is on, the solenoid holds the valve O open to its full width. When the current is cut off, the valve drops automatically by gravity, closing the pipe, or, if desirable, choking the passage, so that only a slow and safe speed can be obtained, thus preventing any danger due to the movement or acceleration of the car except when the driving mechanism is in operation.

In order to prevent a shock which might be caused by the too-sudden closure of the piston-valve J, the double relief-valve Q is placed in the chamber $q$ in the branch pipe $q'$, connecting the pipe F with the casing D. Each valve is held closed against the ordinary working pressure by springs $q^2$, which can be adjusted by bolt $q^3$. If the pressure should rise above that of the springs $q^2$, one of the valves Q will act, allowing the liquid to pass from the casing D to the pipe F if the elevator is running in one direction and allowing it to pass from pipe F to casing D through the other valve Q if the elevator is running in the other direction.

To provide for the possible leakage of the liquid in casing D, I provide a reservoir R, which is connected to the casing D by the pipe $r$. The liquid in the reservoir R is under pressure. As shown, the chamber R is placed in the bed-plate.

In order to provide against movement due to leakage from one side to another of the casing D when the car is at rest—that is, any leakage of the valves such as is experienced in an hydraulic elevator when the packing is not tight—I provide a friction-brake. This friction-brake consists of the friction-strap S, provided with the brake-lever S'. Connected to this brake-lever by means of the link $S^2$ is the bell-crank $S^3$, having a roller which rests on the bar $S^4$, which bar is provided with a depression $S^5$, in which the roller rests when the operative mechanism is central. The movement of the operative mechanism in either direction moves this bar $S^5$ so as to lift the roller out of the depression, and this lifts the brake from the wheel. This bar has a toothed portion gearing with the pinion T on the shaft $t$ of the controlling-switch W. The bar $S^4$ is connected with the piston-valve J through the medium of the following mechanism: Y is a lever pivoted to the frame of the machine and at one end connected by link $y$ with the rod $S^4$ and connected intermediate by means of link $y'$ with the piston-valve rod J'.

Having now fully described my invention, what I claim, and desire to protect by Letters Patent, is—

1. In combination with the rotary shaft of an elevating mechanism, of a casing provided with liquid, a rotary pump in said casing, connection between said pump and the rotary shaft whereby the shaft and pump rotate together, a passage from one side to the other of said casing, adapted to convey liquid, and means controlled by the motor-controlling mechanism to open and close said passage.

2. In combination with the rotary shaft of an elevating mechanism, of a casing provided with liquid, a rotary pump in said casing, connection between said pump and the rotary shaft whereby the shaft and pump rotate together, a passage from one side to the other of said casing, adapted to convey liquid, a valve controlling said passage and operative connection between said valve and the motor-controlling mechanism.

3. In combination with the rotary shaft of an elevating mechanism, of a casing provided with liquid, a rotary pump in said casing, connection between said pump and the rotary shaft whereby the shaft and pump rotate together, a passage adapted to convey liquid, provided at one end with an opening into said casing, a valve-chamber, into which the other end of said passage opens, a valve, ports on opposite sides of the valve opening from said valve-chamber into the casing and operative connection between said valve and the elevator controlling mechanism.

4. In combination with the rotary shaft, of an elevating mechanism, of a casing provided with liquid, a rotary pump in said casing, connection between said pump and the rotary shaft whereby the shaft and pump rotate together, a passage, adapted to convey liquid, provided at one end with an opening into said casing, a valve-chamber, into which the other end of said passage opens, a valve, ports on opposite sides of the valve opening from said valve-chamber into the casing and operative connection between said valve and the elevator controlling mechanism, and a valve in each of said ports the valve in one port opening toward the casing, the valve in the other opening toward the valve-chamber.

5. In combination with the rotary shaft of an elevating mechanism, of a casing provided with liquid, a rotary pump in said casing, connection between said pump and the rotary shaft whereby the shaft and pump rotate together, a passage from one side to the other of said casing, adapted to convey liquid, a valve controlling said passage and operative connection between said valve and the motor-controlling mechanism, a connection between the passage and the casing independent of the valve and pressure-valves in said connection.

6. In combination with the rotary shaft of an elevating mechanism and a source of power for operating the same, of a casing provided with liquid, a rotary pump in said casing, connection between said pump and the rotary shaft whereby the shaft and pump rotate together, a passage from one side to the other of said casing, adapted to convey liquid, a valve controlling said passage and operative connection between said valve and the motor-controlling mechanism, a second valve in said passage and connection between said second valve and the source of power adapted when the power is on to hold said second valve open, said second valve being self-closing.

7. In combination with the rotary shaft of an elevating mechanism, and a source of power for operating the same, of a casing provided with liquid, a rotary pump in said casing, connection between said pump and the rotary shaft whereby the shaft and pump rotate together, a passage, adapted to convey liquid, provided at one end with an opening into said casing, a valve-chamber, into which the other end of said passage opens, a valve in said chamber, ports on opposite sides of the valve opening from said valve-chamber into the casing and operative connection between said valve and the elevator controlling mechanism, a second valve in said passage and connection between said valve and the source of power adapted when the power is on to hold said valve open, said valve being self-closing.

8. In combination with the rotary shaft of an elevating mechanism, of a casing provided with liquid, a rotary pump in said casing, connection between said pump and the rotary shaft whereby the shaft and pump rotate together, a passage from one side to the other of said casing, adapted to convey liquid, and means controlled by the motor-controlling mechanism to open and close said passage, a source of liquid-supply and connection between said casing and the source of liquid-supply.

9. In combination with the rotary electric motor of an elevating mechanism and a source of electric power for operating the same, of a casing provided with liquid, a rotary pump in said casing, connection between said pump and the rotary motor whereby the motor and pump rotate together, a passage from one side to the other of said casing, adapted to convey liquid, a valve controlling said passage and operative connection between said valve and the motor-controlling mechanism, a second valve in said passage, a solenoid or magnet in electrical connection with the source of electrical power and the motor, adapted when energized to hold said valve open, said valve being self-closing.

10. In combination with the rotary electric motor of an elevating mechanism and a source of electric power for operating the same, of a casing provided with liquid, rotary pump in said casing, connection between said pump and the rotary motor whereby the motor and pump rotate together, a passage adapted to convey liquid, provided at one end with an opening into said casing, a valve-chamber, into which the other end of said passage opens, a valve, ports on opposite sides of the valve opening from said valve-chamber into the casing and operative connection between said valve and the elevator controlling mechanism, a second valve in said passage, a solenoid or magnet in electrical connection with the source of electrical power and the motor, adapted when energized to hold said second valve open, said second valve being self-closing.

11. In an elevating mechanism, in combination a motor, a source of power for said motor and power-controlling mechanism for said power, a brake-wheel, a pivoted brake-lever for said wheel, a brake-strap connected to said lever, a bar, having a depression, a roller on said bar, connection between said roller and the brake-lever, said bar being provided with a rack, a pinion meshing with said rack and connection between said pinion and the motor-power-controlling mechanism.

12. In combination with a rotary shaft, of an elevating mechanism, of a casing provided with liquid, a rotary pump in said casing, connection between said pump and the rotary shaft, whereby the shaft and pump rotate together, a passage from one side to the other of said casing, adapted to convey the liquid, a valve controlling said passage, check-valves located so that when the valve controlling said passage is thrown one way the rotary pump and shaft can revolve in only one direction and when thrown in the other way the rotary pump and shaft can revolve only in the opposite direction, and operative connection between said valve and the motor-controlling mechanism.

In testimony of which invention I have hereunto set my hand, at Winnetka, Illinois, on this 7th day of February, 1900.

FRANK E. HERDMAN.

Witnesses:
 ALBERT S. CAPRON,
 J. C. BURKITT.